July 7, 1925.
G. H. DAWSON ET AL
1,545,237
TRUSSED STRUCTURE
Original Filed Nov. 26, 1923
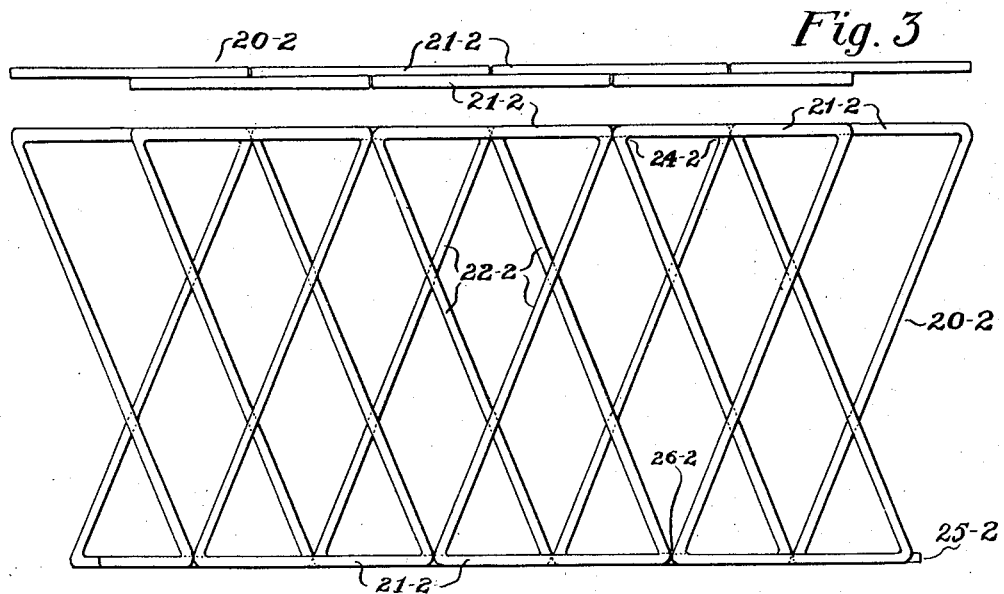
Fig. 3
Fig. 2
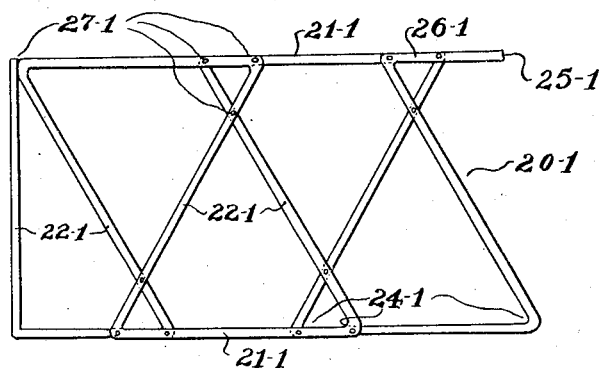
Fig. 1
Inventors
George Hives Dawson
Hurxthal Field Frease
By Frease and Bond Attorneys

Patented July 7, 1925.

1,545,237

UNITED STATES PATENT OFFICE.

GEORGE HIVES DAWSON, OF BOSTON, MASSACHUSETTS, AND HURXTHAL FIELD FREASE, OF CANTON, OHIO.

TRUSSED STRUCTURE.

Original application filed November 26, 1923, Serial No. 676,897. Divided and this application filed December 12, 1924. Serial No. 755,401.

*To all whom it may concern:*

Be it known that we, GEORGE HIVES DAWSON and HURXTHAL FIELD FREASE, citizens of the United States, residing, respectively, at Boston, in the county of Suffolk and State of Massachusetts, and at Canton, in the county of Stark and State of Ohio, have invented new and useful Improvements in Trussed Structures, of which the following is a specification.

The invention relates to trussed structures having spaced chord members and connecting web members joined together; and this application is a division of our prior application for patent for trussed structures, filed November 26, 1923, Serial No. 676,897.

Ordinarily the chord and web members of a trussed structure are separate pieces which must be made to size and assembled to form the completed structure. In the manufacture of even a simple trussed girder of substantial length, while the equivalent of a large number of chord members is attained by the use of two or more strips of the total length of the girder, yet there are still a large number of separate web members each of which must be made and punched to size and each of which must be properly assembled and fastened usually by means of rivets to the continuous equivalents of a large number of chord members. In the manufacture of such a girder the number of separate members each of which must be made to size and assembled often runs to several hundred. Due to the fact that most of these members must be fastened at each end to the co-operating members in the structure or the equivalents thereof, the number of chances for manufacturing and assembling errors, for two ended members, is double the number of members or equivalents to be assembled. Moreover in such an assembled trussed structure unequal strains and stresses are often set up in individual members due to the fact that it has been found to be a practical impossibility accurately to space and secure the fastening means which tie the truss members together at the joints.

The objects of the present invention are to economize the manufacture of trussed structures and to overcome unequal strains and stresses due to erection inaccuracies, by reducing the number of parts to be made and assembled; and these objects are attained by the use of—

Trussed elements formed from single continuous strips, and including spaced rows of chord members and connecting web members, and overlapped and opposed junction angles between the chord and web members.

The invention is illustrated in the accompanying drawing forming part hereof, in which—

Figure 1 is a fragmentary elevation of a trussed element having overlapped junction angles;

Fig. 2, a fragmentary elevation of a trussed element having overlapped and abutted junction angles; and Fig. 3, a top plan view of the same.

Similar numerals refer to similar parts throughout the drawing.

While the continuous material used to form the trussed elements may be of any desired substance; for most practical purposes a continuous metallic material adapts itself easily to the necessary forming operations, and to assembly by the use of any desired fastening means such as riveting, welding, or mechanical means.

Referring to Fig. 1, a trussed element $20^1$, includes alternating chord members $21^1$ and web members $22^1$, formed from a continuous rod $25^1$, and having junction angles $24^1$ between the chord and web members. The junction angles are overlapped as shown to form the plural joints $26^1$, which are adapted for fastening, as by means of the spot welds $27^1$; and the joints constitute themselves small triangular truss bays which not only strengthen the whole structure but also provide convenient points for wiring or otherwise fastening other material to the chord members.

Referring to Figs. 2 and 3, a modified trussed element $20^2$, includes alternating chord members $21^2$ and web members $22^2$, formed from a continuous rod $25^2$, and having junction angles $24^2$ between the chord and web members. The junction angles are overlapped and abut each other as at $26^2$, and are adapted to be fastened to the side by side chord members as by means of spot welding not shown, and thus provide a trussed element made from a continuous strip and having chord members whose cross sectional area is a multiple of the area of any web member.

The trussed elements of the present invention may themselves be used as load carrying members, or may be combined in any desired manner as component parts of more complex structures.

We claim—

1. A trussed element formed from a continuous strip and including spaced rows of chord members and connecting web members and opposed junction angles between the chord and web members, the opposed angles being overlapped, and there being means fastening the truss members together.

2. A trussed element formed from a continuous strip and including spaced rows of chord members and connecting web members, and opposed junction angles between the chord and web members, the opposed angles overlapping and abutting each other, and there being means fastening the truss members together.

3. An element for making a truss from a continuous strip, said element including spaced rows of chord members and connecting web members, and opposed junction angles between the chord and web members, all formed in a continuous strip, and the opposed angles being overlapped.

4. An element for making a truss from a continuous strip, said element including spaced rows of chord members and connecting web members, and opposed junction angles between the chord and web members, all formed in a continuous strip, and the opposed angles overlapping and abutting each other.

5. An element for making a truss from a continuous strip, said element including spaced rows of chord members and connecting web members, and opposed junction angles between the chord and web members, all formed in a continuous strip, and the chord members abutting each other, and constituting a truss chord having a cross-sectional area which is a multiple of the cross-sectional area of the strip.

6. An element for making a truss from a continuous strip, said element including spaced rows of chord members and connecting web members, and opposed junction angles between the chord and web members, all formed in a continuous strip, and the opposed angles overlapping each other and forming triangles.

7. A trussed element formed from a continuous strip, and including spaced rows of chord members and connecting web members, and opposed junction angles between the chord and web members, the opposed angles overlapping each other and forming triangles, and there being means fastening the truss members together at the apexes of the triangles.

In testimony that we claim the above, we have hereunto subscribed our names.

GEORGE HIVES DAWSON.
HURXTHAL FIELD FREASE.